US010958145B2

(12) United States Patent
Gastaldi

(10) Patent No.: US 10,958,145 B2
(45) Date of Patent: Mar. 23, 2021

(54) PROCESS FOR OVER-MOULDING AN OUTER STATOR

(71) Applicant: DEMAK S.R.L., Turin (IT)

(72) Inventor: Maurizio Gastaldi, Turin (IT)

(73) Assignee: DEMAK S.R.L., Turin (IT)

( * ) Notice: Subject to any disclaimer, the term of this patent is extended or adjusted under 35 U.S.C. 154(b) by 261 days.

(21) Appl. No.: 16/098,174

(22) PCT Filed: Nov. 8, 2016

(86) PCT No.: PCT/IB2016/056710
§ 371 (c)(1),
(2) Date: Nov. 1, 2018

(87) PCT Pub. No.: WO2017/199075
PCT Pub. Date: Nov. 23, 2017

(65) Prior Publication Data
US 2019/0149025 A1    May 16, 2019

(30) Foreign Application Priority Data

May 18, 2016 (IT) .................. 102016000050768

(51) Int. Cl.
*H02K 15/00*    (2006.01)
*H02K 15/12*    (2006.01)
(Continued)

(52) U.S. Cl.
CPC .......... *H02K 15/12* (2013.01); *B29C 33/505* (2013.01); *B29C 39/10* (2013.01); *H02K 5/08* (2013.01);
(Continued)

(58) Field of Classification Search
CPC ........ H02K 15/12; H02K 15/02; H01B 3/085; B29C 39/10; B29C 33/505; Y10T 29/49009; Y10T 29/53143
(Continued)

(56) References Cited

U.S. PATENT DOCUMENTS 3,025,188 A * 3/1962 Larsh .................... H01B 3/085
427/104
3,177,105 A * 4/1965 Wiltshire .............. B29C 70/446
156/218
4,876,050 A * 10/1989 Horton ................ B29C 35/0222
264/102

FOREIGN PATENT DOCUMENTS

| EP | 1231701 | 8/2002 |
| GB | 815164 | 6/1959 |
| GB | 1200927 | 8/1970 |

OTHER PUBLICATIONS

International Search Report for corresponding application PCT/IB2016/056710 filed Nov. 8, 2016; dated Feb. 22, 2017.
(Continued)

*Primary Examiner* — Donghai D Nguyen
(74) *Attorney, Agent, or Firm* — Cantor Colburn LLP

(57) ABSTRACT

A method for resin coating electrical windings enclosed within a housing of an electric motor and defining a central cylindrical cavity, the method including preparing a core having an elastic wall that encloses an inner chamber having an opening provided with a selective shut-off means, as well as a lower disc-like portion and an upper cylindrical portion that protrudes from a surface of the lower portion, coupling the core and an electric motor stator, in such a way that the upper portion occupies the cavity of the stator, and the lower portion is positioned within a housing of the motor below the electric windings, inflating the inner chamber through the opening, in such a way that the lower portion comes into (Continued)

contact with an inner surface of the housing and the upper portion comes into contact with the windings, which define a central cavity of the stator, pouring a resin so that it coats the windings when they are not in contact with the core; deflating through the opening the inner chamber, and separating the core from the stator, whose windings are coated with resin.

12 Claims, 3 Drawing Sheets

(51) Int. Cl.
| | |
|---|---|
| *B29C 33/50* | (2006.01) |
| *H02K 5/08* | (2006.01) |
| *B29C 39/10* | (2006.01) |
| *H02K 15/02* | (2006.01) |

(52) U.S. Cl.
CPC ......... *H02K 15/02* (2013.01); *Y10T 29/49009* (2015.01)

(58) Field of Classification Search
USPC .......................................... 29/596, 598, 732
See application file for complete search history.

(56) References Cited

OTHER PUBLICATIONS

Written Opinion of the International Searching Authority for corresponding application PCT/IB2016/056710 filed Nov. 8, 2016; dated Feb. 22, 2017.

\* cited by examiner

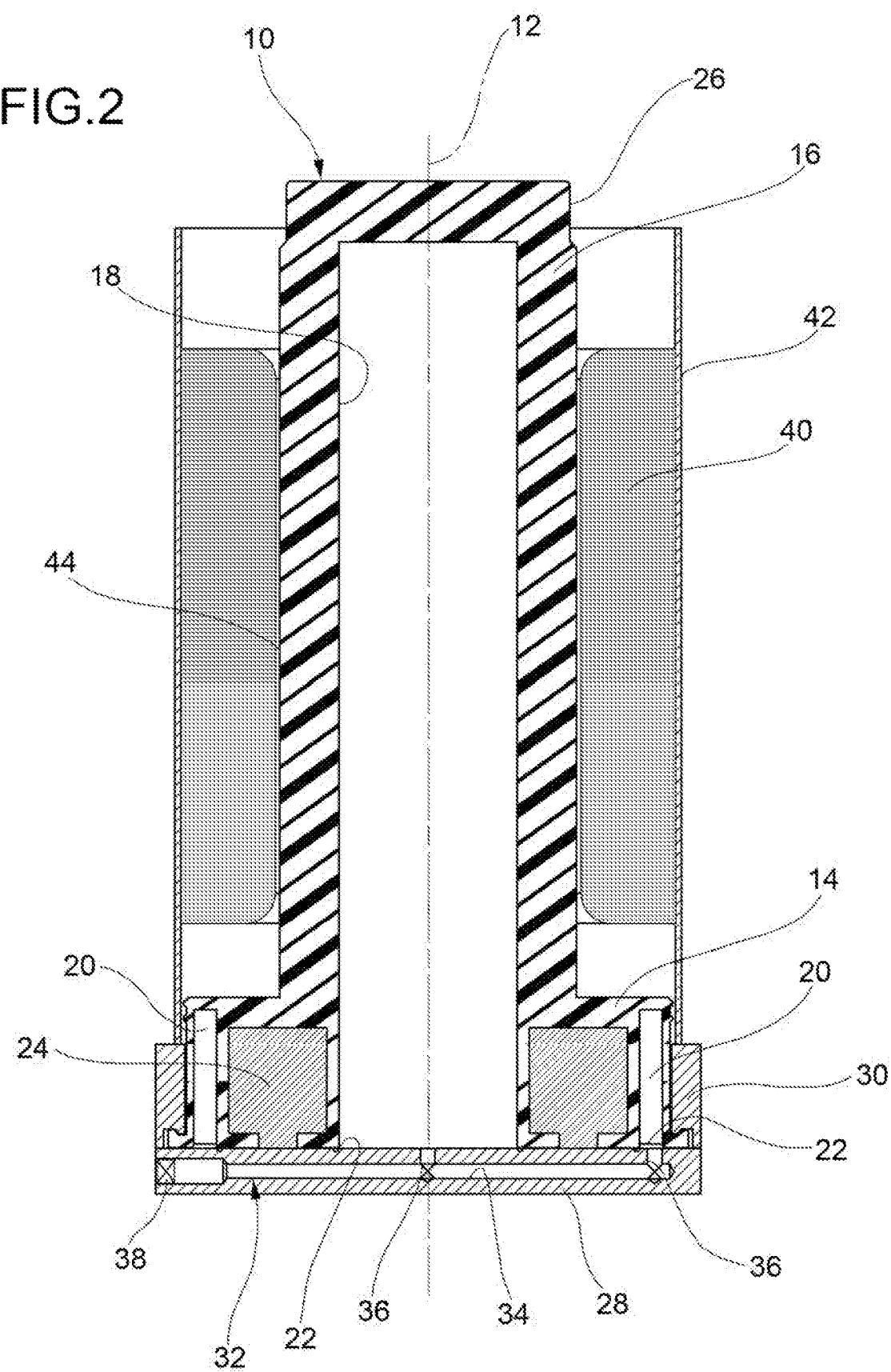

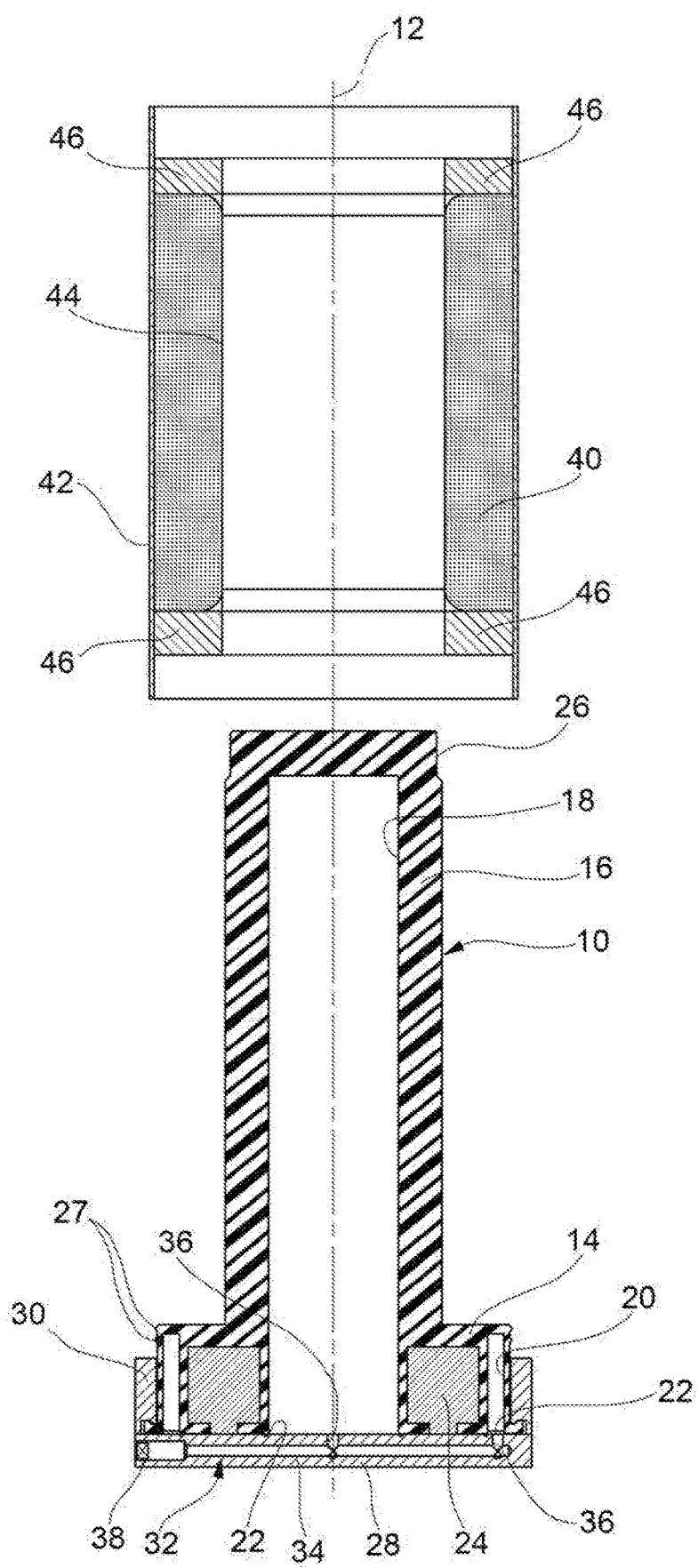

PROCESS FOR OVER-MOULDING AN OUTER STATOR

TECHNICAL FIELD

The present disclosure relates to a method for embedding in a two-component resin electrical windings enclosed within the housing of an electric motor stator having a central cylindrical cavity in which is housed the related rotor.

BACKGROUND

This method is typically conducted in an oven, after pouring liquid, two-component resin on the windings where it cures, forming a solid layer of coating. It is therefore critical to ensure that the resin only comes in contact with the parts of the windings that are to be actually embedded. Otherwise, the functionality of the motor will be compromised, unless long and complex resin removal methods are subsequently carried out on parts on which resin has been improperly poured and which are intended to house the rotor.

Therefore, according to a known technique, prior to pouring the resin, a core of a material having a thermal expansion coefficient higher than that of the stator material is inserted within the central cavity, for example a core made of Teflon or similar plastic material. The pre-heating that takes place in the oven therefore determines differential expansions that bring the core in contact with the parts of the stator's windings facing it, making sure the latter can then come into contact with the resin. The resin can then be poured and left to cure in the oven, forming a coating layer only where desired. Finally, as a result of the cooling and the consequent shrinkage of the core, the latter can be separated from the stator.

However, the time required for the cooling process to occur spontaneously is rather long and thus economically incompatible with an industrial working cycle. Consequently, it is necessary to conduct a forced cooling process with the risk that it will produce fissures, cracks, etc. in the resin coating.

Moreover, the separation operation requires applying a significant mechanical force, which can cause scratches and abrasions to form on the core's outer surface. Therefore, after a few working cycles, the core has an outer surface so damaged as to be useless and in need of replacement.

BRIEF SUMMARY

One aim of the present disclosure is therefore to remedy the above described drawbacks in the known resin coating methods.

In the disclosed method of the, a sealing contact is temporarily created between the inner core and the stator's surfaces facing it by inflating/deflating one or more chambers within the core.

These operations are decidedly shorter and more easily controlled with respect to those provided in the prior art, which require one to accurately monitor the expansions, and therefore the temperatures of the parts in contact, waiting the time necessary first to heat them and then to cool them. In principle, the method of the present disclosure allows one to separate the resin-coated stator from the still hot core, that is, immediately after the resin cures, without having to wait for the core to cool and shrink, as was instead necessary per the prior art.

Moreover, the deflation of the core before its removal from the central cavity of the stator cancels the mutual interference and thus greatly reduces the extent of the removal force to be exerted and the associated risk of scratches and abrasions. Consequently, the core can be used for a high number of working cycles, reducing the cost of the coating method of the disclosure.

Advantageously, the core can be deflated even faster by drawing air from the inner chamber and thus generating a vacuum.

BRIEF DESCRIPTION OF THE DRAWINGS

Further advantages and characteristics of this disclosure will become apparent from the detailed description that follows, provided by way of non-limiting example with reference to the accompanying drawings, in which:

FIGS. 2 and 3 are schematic views in longitudinal cross-sections of successive stages of the disclosed method of the.

DETAILED DESCRIPTION

Figure 1:
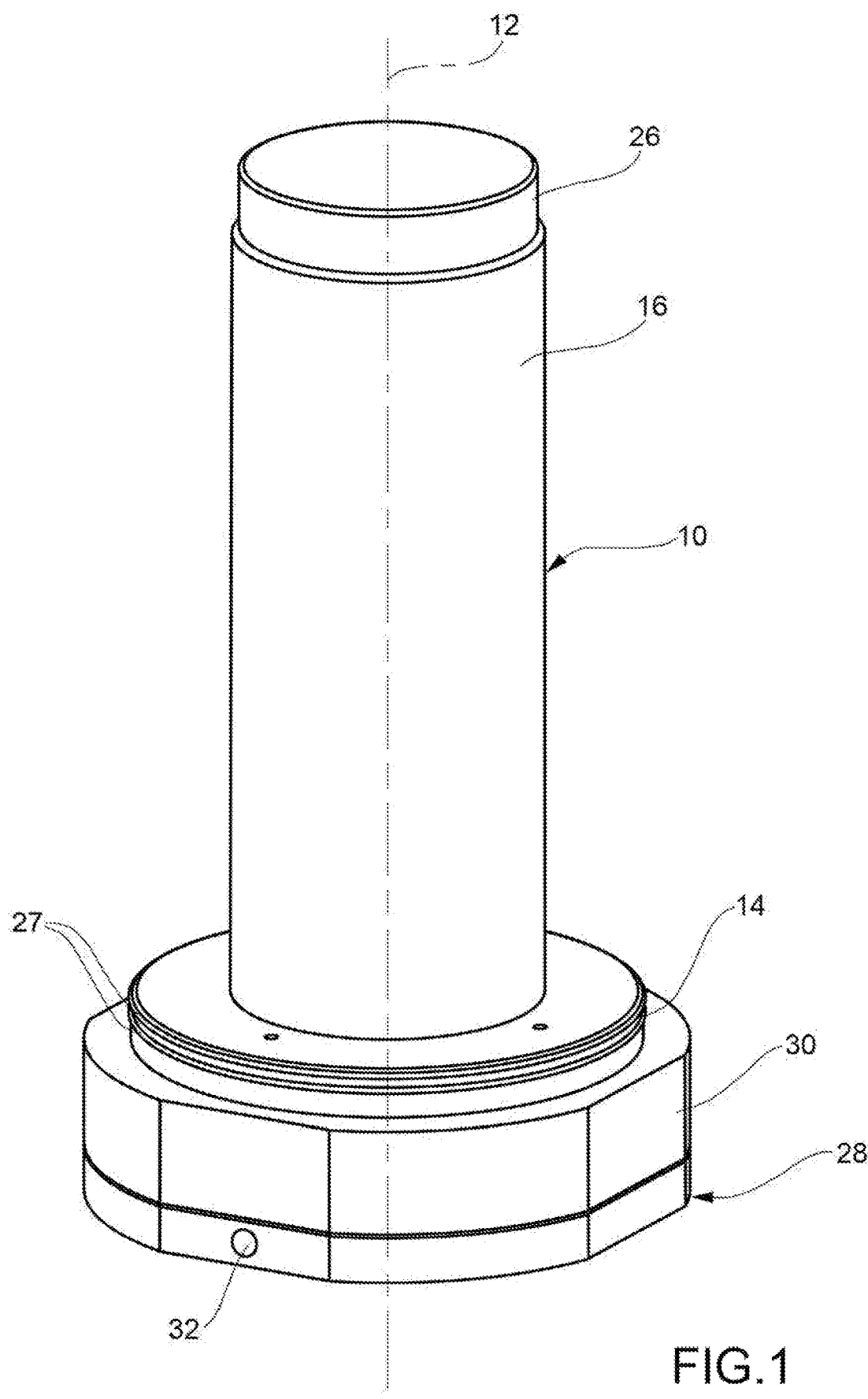
FIG. 1 is a perspective representation of a core fixed to a support and can be used in a method according to an embodiment of the disclosure.

A core 10 for undertaking a resin coating method is configured symmetrically (FIG. 1) with respect to a central longitudinal axis 12 and has a disc-shaped lower portion 14 and an upper cylindrical portion 16 that protrudes from a central zone of a surface facing upward of the lower portion 14. Both portions 14 and 16 have circular cross-sections.

The core 10 has an elastic wall, for example of silicone rubber, which encloses a first inner chamber 18 of cylindrical shape and with a circular cross-section, arranged centrally and extending through the upper and lower portions 14, 16, and a second inner chamber 20 having a ring shape and extending in a peripheral region of the lower portion 14 coaxially outside the lower end of the first chamber 18. Chambers 18, 20 respectively have openings 22 toward the lower side.

The wall of the lower portion 16 also surrounds a metal ring 24 arranged coaxially within the second chamber 20 and the outside of the lower end of the first chamber 18. From the side wall of the lower portion 14, two sealing projections 27 protrude externally, extending circumferentially and axially staggered. On the other hand, the upper end of the upper portion 16 has a slight recess 26 in the radial direction which extends over its entire circumference.

The lower portion 14 of the core 10 is fixed on the lower side to a disc-shaped metal support 28 (in a conventional manner, not shown in the figures) by means of screws which pass through axial holes of the support 28 and engage in downward-facing threaded holes made in the ring 24. A circumferential projection 30 also protrudes from the periphery of the upper face of the support 28 which surrounds the lower portion 14 up to a certain height, enabling the attachment. A channel 32 is made in the support 28 having a first branch 34 extending in the radial direction and from which branch off two second branches 36 extending in a direction parallel to the axis 12 and communicating respectively with the openings 22 directed toward the lower side of the inner chambers 18, 20. The first branch 34 of the channel 32 also communicates with the external environment and a shut-off valve 38 is provided. As will be shown in more detail in the following description, due to the valve 38 and the channel 32 communicating with the openings 22, chambers 18, 20 can be brought into positive/negative pressure with respect to the external environment.

The core 10 just described can be used in a method for resin coating (FIGS. 2 and 3) electrical windings 40 enclosed within a housing 42 of the stator of an electric motor and defining a central cylindrical cavity 44.

This method provides first (FIG. 2) for coupling the core 10 with the stator, in such a way that the upper portion 16 of the core 10 occupies the central cavity 44 of the stator in correspondence of the electric windings 40, and the lower portion 14 of the core 10 is positioned partially within the housing 42 below the windings 40.

This coupling occurs by insertion and is facilitated by the fact that the inner chambers 18, 20 of the core 10 are kept deflated during this phase of work.

Then, the chambers 18, 20 are inflated through the respective openings 22 by opening the valve 38 and injecting air into the channel 32. In this way, the lower portion 14 comes into contact with an inner surface of the housing 42, while the upper portion 16 comes into contact with a wall of the central cavity 44 of the stator 40 formed by the electrical windings 40.

Then, the resin is poured from above into the housing 42, and is prevented from running out the bottom by the lower portion 14, which seals radially against the housing 42, and in particular by the circumferential projection 27. The resin can thus cover the windings 40, except in the parts in contact with the upper portion 16 of the core 10. In a per se known manner, the stator coupled with the core 10 is heated in an oven to cause the curing of the resin that forms a coating 46 on the windings 40, except on the parts in contact with the core 10.

Once the curing is finished, the chambers 18, 20 are deflated by opening the valve 38 and preferably by evacuating the air from the inside through the channel 32 and the openings 22.

The core 10 is thus no longer in forced contact with the housing 42 and the windings 40, and can be separated (FIG. 3) from the stator, whose resin coating is therefore terminated.

It should be emphasized that the phases of deflation and separation can be conducted immediately after the pouring and curing of the resin, with a considerable reduction of the overall time necessary for conducting the entire method.

The final separation phase is also facilitated by the recess 26 on the top end of the upper portion 16 of the core 10 and does not require one to exert high forces on the latter, which therefore remains intact and can be advantageously reused for the resin coating of numerous other motors by respective work cycles similar to that just described.

Naturally, without altering the principle of the disclosure, the details of construction and embodiments may vary widely with respect to those described purely by way of example, without thereby departing from the disclosure as defined in the appended claims.

The invention claimed is:

1. A method for resin coating electrical windings enclosed within a housing of a stator of an electric motor and defining a central cylindrical cavity, said method comprising the steps of:

preparing a core having an elastic wall that encloses at least one inner chamber having an opening provided with a selective shut-off means, said core having a lower disc-like portion and an upper cylindrical portion that protrudes from a surface of the lower disc-like portion, coupling said core and said stator, in a manner such that said upper cylindrical portion of the core occupies the cavity of the stator, and said lower disc-like portion of the core is positioned within said housing below the windings, inflating through said opening said at least one inner chamber of the core, in a manner such that said lower disc-like portion comes into contact with an inner surface of the housing and said upper cylindrical portion comes into contact with the windings which define said cavity of the stator, pouring said resin to coat said windings wherein said windings are not in contact with the core, curing said resin that forms a coating on said windings wherein said windings are not in contact with the core, deflating said at least one inner chamber of the core through said opening so that the core is no longer in forced contact with the housing and the windings, and separating the core from the stator, whose windings are coated with said resin, wherein said core has a first inner chamber of cylindrical shape, arranged centrally and extending through said upper cylindrical portion and lower disc-like portion and a second inner chamber having a ring shape and extending in a peripheral region of said lower disc-like portion and wherein said lower disc-like portion is fixed to an underlying support, within which a channel is formed communicating with the external environment and with said opening, and provided with a shut-off valve, so that the first and second inner chambers are inflated by opening the shut-off valve and injecting air through the opening, and deflated by opening the shut-off valve and evacuating air through the opening.

2. The method according to claim 1, wherein said first and second inner chambers are kept deflated during the coupling step.

3. The method according to claim 1, wherein the curing step is effected by heating in an oven the stator coupled with the core.

4. The method according to claim 1, wherein the deflating step is conducted immediately after the curing step.

5. A core for performing a method of resin coating electrical windings enclosed within a housing of a stator of an electric motor and defining a central cylindrical cavity, the core comprising:

an elastic wall that encloses at least one inner chamber having an opening provided with a selective shut-off means;

a lower disc-like portion; and an upper cylindrical portion that protrudes from a central zone of a surface facing upward of the lower disc-like portion, wherein said lower disc-like portion is fixed to an underlying support, within which a channel is formed communicating with an external environment and with said opening, and provided with a shut-off valve.

6. The core according to claim 5, which core is configured symmetrically with respect to a longitudinal central axis.

7. The core according to claim 5, which core has a first inner chamber of cylindrical shape, arranged centrally and extending through said cylindrical upper portion and lower disc-like portion and a second inner chamber having a ring shape and extending in a peripheral region of said lower disc-like portion.

8. The core according to claim 7, wherein the wall of said lower disc-like portion surrounds a metallic ring disposed coaxially inside said second inner chamber and outside of said first inner chamber.

9. The core according to claim 5, wherein said channel has a first branch extending in a radial direction and from which there extends at least one second branch extending in an axial direction and communicating with said opening.

10. The core according to claim 5, wherein the top end of said upper cylindrical portion has a radial recess.

11. The core according to claim 5, wherein at least one circumferential projection protrudes laterally from said lower disc-like portion.

12. The core according to claim 5, wherein said underlying support is disc-shaped.

* * * * *